Jan. 20, 1970   R. H. VAN SAUN ET AL   3,490,278
TESTING MACHINE
Filed July 11, 1968   2 Sheets-Sheet 1

INVENTORS.
RAYMOND H. VAN SAUN
JOHN T. BELL
RICHARD G. TAUS
ILIJUS KOTOV
BY
ATTORNEY

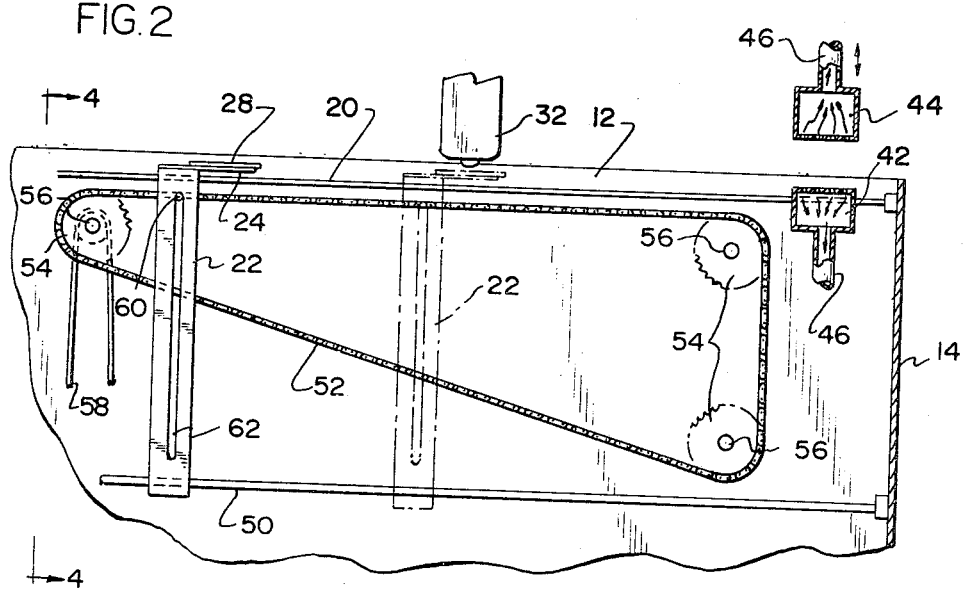
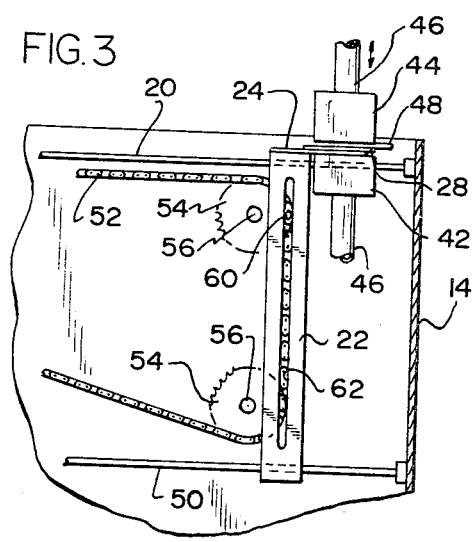
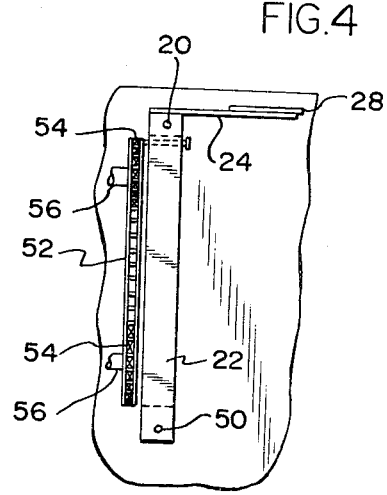

United States Patent Office 3,490,278
Patented Jan. 20, 1970

3,490,278
TESTING MACHINE
Raymond H. Van Saun, Geneva, John T. Bell, Lombard, Richard G. Taus, Berwyn, and Ilijus Kotov, Riverside, Ill., assignors to Container Corporation of America, Chicago, Ill., a corporation of Delaware
Filed July 11, 1968, Ser. No. 744,029
Int. Cl. G01b 19/08
U.S. Cl. 73—150                                       6 Claims

ABSTRACT OF THE DISCLOSURE

A machine for testing characteristics of adhesive used to bond a pair of articles to each other has a variable speed conveyor for transporting at least one of the articles between first and second stations on the machine. The first station has one or more adhesive applicators for applying adhesive to the article conveyed. The second station has a pair of spaced upper and lower pressure elements which receive both articles and bring them together under pressure for a desired length of time to cause the articles to adhere to each other. A measurement of a force necessary to separate the adhered articles when the pressure elements are separated, determines the effectiveness of the adhesive used.

BACKGROUND OF THE INVENTION

Field of the invention

Figure 1:
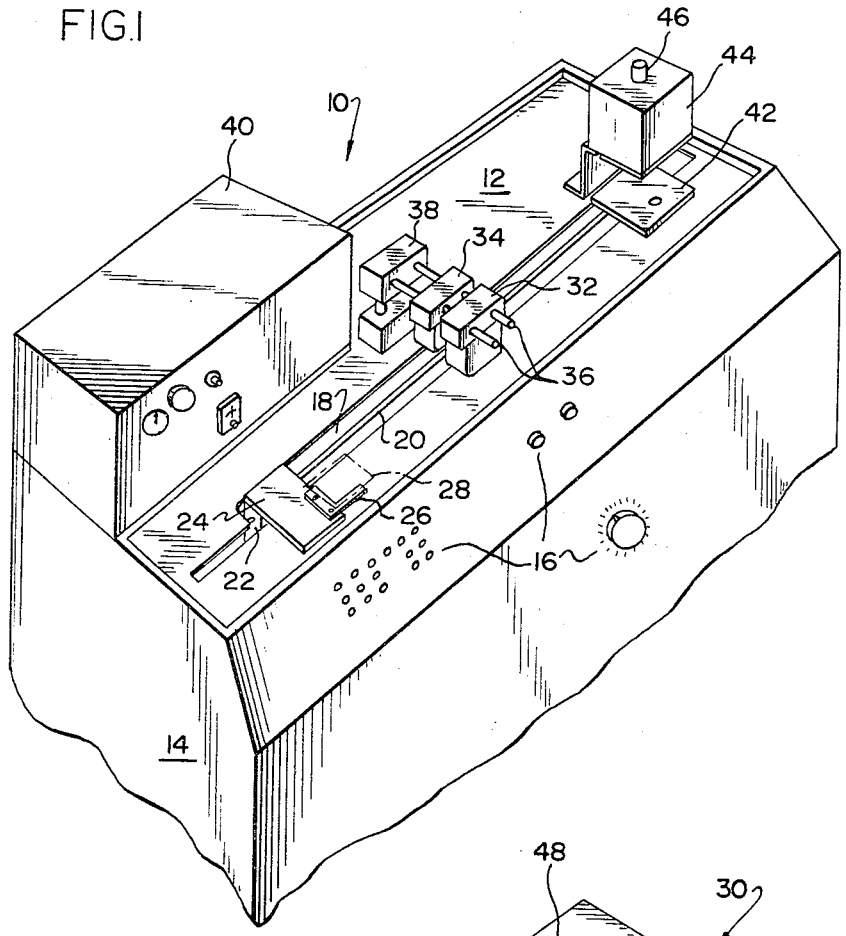

This invention relates to a machine for testing the performance of adhesives and, more particularly, to a machine for testing the performance of adhesives in securing two articles, such as portions of paperboard or the like, to each other.

The prior art

It has been common practice in the paperboard container industry to utilize adhesives for securing the overlapping flaps or panels of a container together. A problem exists in the use of adhesives, such as the hot melt type, due to the fact that the temperature is quite critical to the durability of the bond provided by the adhesive. A container may be securely held by an adhesive at its manufacturing joint and at the end closure flaps quite satisfactorily at 90° temperature but may fail at temperatures as low as 20° or as high as 150°. The failing temperatures are easily obtainable in winter or cold storage conditions on one hand, or in summer, or in transit on the other hand. Additional problems are presented because of various coatings which are commonly applied today to the surfaces of paperboard containers.

Heretofore, the industry did not have any suitable testing equipment for comparing different adhesives against one another, or for comparing the same adhesive when used in varying amounts with the same board, or used in equal amounts but on different boards.

SUMMARY OF THE INVENTION

The machine of the present invention represents an improvement over all available testing machines in that it can be used under a variety of testing conditions to make meaningful comparative tests so as to reach meaningful conclusions of comparative performances. Since the speed of conveying, the temperature, the amount and kind of adhesive, and the pressure required to cause the adherence of articles to each other can be varied, tests can be conducted on the machine closely resembling the actual working conditions in a container manufacturing plant.

Generally, the machine is used to secure two articles, such as sheets of paperboard or the like, together in a somewhat offset fashion so that the edges do not line up but provide free outward projections. Such an arrangement permits utilization of a single sample to test the sheer strength, the tensile strength, and the peel strength of the adhesive. Other arrangements of sheets are also possible.

The machines comprise a moving carriage upon which is placed one of the articles, such as a small sheet of paperboard. The article is conveyed through the machine, the speed of conveying being variable to simulate the speed of an actual blank as it would be fed through a container forming machine. The article passes beneath an adhesive applying station where any desired pattern of adhesive may be applied to the surface thereof. The amount of adhesive applied may be varied, either by varying the pressure, the volume or the temperature of the adhesive. Another variable is provided by controlling the speed with which the article passes the adhesive applying station. After the adhesive has been applied, the article is moved, at selected speed, to a second station which comprises a pair of pressure elements. The article having the adhesive thereon is placed on the lower of the elements while a second article is held by vacuum to the lower portion of the upper of the pressure elements. After a given time has elapsed from application of the adhesive to the first article, a power cylinder is actuated to force the upper pressure element, together with the second article, to be brought in contact with the first article and the lower pressure element. The power cylinder can be adjusted to present a varying pounds per square inch force between the lapped articles. Similarly, the duration of holding of the two articles under pressure can be varied. After predetermined time has elapsed the pressure elements may be separated. If vacuum is introduced to the pressure elements at separation the articles may be pulled apart by the separating elements while the amount of force necessary to pull the articles apart is being observed.

DRAWINGS

FIGURE 1 is a perspective view of the machine of the present invention;
FIGURE 2 is a front elevational view of the machine with the front cover panel removed for clarity;
FIGURE 3 is a view illustrating application of pressure to the sample;
FIGURE 4 is a sectional view taken generally along the line 4—4 of FIGURE 2; and
FIGURE 5 (shown on the first sheet of drawings) is a perspective view of the test sample.

SPECIFICATION

While this invention is susceptible of embodiment in many different forms, there is shown in the drawings and will herein be described in detail, an embodiment of the invention with the understanding that the present disclosure is to be considered as an exemplification of the principles of the invention and is not intended to limit the invention to the embodiment illustrated. The scope of the invention will be pointed out in the appended claims.

Referring now to the drawings, more specifically to FIGURE 1, there is shown a testing machine generally designated 10. The machine has a flat top surface 12 and is provided with cover panels 14. The front panel 14 has necessary controls 16 mounted thereon. The top surface 12 has an elongated open slot 18 wherein is mounted a rod 20. A sliding bar 22, best seen in FIGURES 2 and 3, and having a carriage 24 secured to the top thereof, is slidably mounted on the rod 20 for movement thereon as later described. The carriage 24 has a bracket 26 attached thereto by conventional means for holding a first article 28 of a sample 30 (shown in FIGURE 5).

A pair of adhesive applicators 32 and 34, from which adhesive is extruded, are slidably mounted on rods 36 spaced from the top surface 12 of the machine to overlie the article 28 when the same is advanced by the carriage 24 past the adhesive applicators. The applicators 32 and 34 are connected by rods 36 to a support unit 38, the distance between the applicators and the support unit being adjustable as desired.

The applicator 32 is used for dispensing hot melt adhesive and is connected by conventional means (not shown) to a hot melt adhesive auxiliary unit 40. Controls are provided on the unit 40 to insure proper dispensing of the hot melt adhesive through the applicator 32. The applicator 34 is used for cold set adhesive and is connected to an auxiliary unit (not shown) for the cold set adhesive.

A pair of pressure elements 42 and 44 are located downstream from the adhesive applicators 32 and 34. The lower pressure element 42 is stationary while the upper pressure element 44 is adapted to move in a vertical direction in and out of registry with the lower pressure element 42. The elements are connected to a source of vacuum for the purpose to be described in detail later. The movement of the upper pressure element 44 is caused by actuation of an air cylinder (not shown) which is connected to the element 44 by a connector 46.

When vacuum is applied to the upper pressure element 44, a second article 48 of the sample 30 is placed against the article receiving surface of the pressure element, and held there by vacuum applied through a plurality of perforations formed in said surface.

Referring now to FIGURES 2-4, the bar 22 is shown slidably mounted on the rod 20, heretofore described, and another rod 50 which is similar and parallel to the rod 20. An endless chain 52 is supported between three sprockets, all designated 54. Each of the sprockets is conventionally mounted or keyed to one of the rotary shafts 56. The shaft 56 of one of the sprockets 54 is connected to a power source, such as a variable speed drive (not shown), by a chain 58.

A pin 60 is secured to the chain 52 and is adapted to ride in a slot 62 formed in the sliding bar 22.

When the chain 52 is placed in motion by operation of the chain 58, the pin 60, being in engagement with the slot 62, moves the bar 22 from left to right, as viewed in FIGURES 2 and 3. When the bar reaches the position shown in FIGURE 3, it dwells there while the pin 60 travels in the slot 62 downwardly together with the movement of the chain 52 until it reaches the lower portion of the slot 62. During this dwell period of the sliding bar, an air cylinder (not shown) is actuated to move the upper pressure element 44 downwardly and into registry with the lower pressure element 42 thereby sandwiching the articles 28 and 48 therebetween to cause adherence of these articles to each other. After the pin 60 has reached the lower portion of the slot 62, it again begins to move the sliding bar 22 toward its original starting position, best seen on the lefthand side of FIGURE 2. The same cycle can be repeated as desired after the article 28 has been changed, or otherwise.

Figure 5:
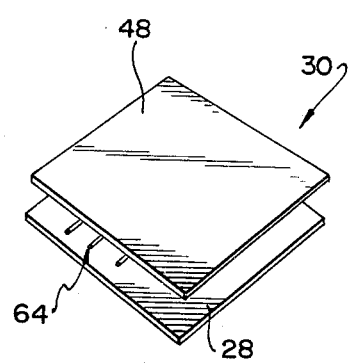

In the operation of the machine, the upper piece of test material, or article 48, is placed against the article receiving surface of the pressure element 44 and held there by vacuum applied to the pressure element. The lower piece of test material, or article 28, is placed in the bracket 26 of the carriage 24. Upon activation of the variable speed drive, the chain 52 begins to move and, as heretofore described, advances the sliding bar 22 and the carriage 24 from left to right (as viewed in FIGURES 2 and 3). The article 28 of the sample 30 is advanced at a predetermined speed beneath the adhesive applicator 32, if hot melt adhesive is to be used, or beneath the cold set adhesive applicator 34, if cold set adhesive is to be employed. At this first station, comprising the adhesive applicators, a desired pattern of adhesive, such as strips 64 shown in FIGURE 5, is applied to the top surface of the article 28 of the sample 30. Following the application of adhesive, the article 28 is moved into the second station, which comprises the pair of pressure elements 42 and 44. Here, the article is placed over the article receiving surface of the pressure element 42 and, after desired dwell time, if any, the actuation of the air cylinder causes the upper pressure element 44 to move downwardly toward element 42 thereby sandwiching articles 28 and 48 between the elements to cause adherence of the articles to each other. The amount of pressure and the time under pressure can be adjusted as desired. After holding the sample sandwiched between the pressure elements for a selected period of time, the elements are separated by operation of the air cylinder. If, in the course of separation, vacuum is introduced into pressure elements, the force which is necessary to separate the sample articles 28 and 48 may be measured thereby determining the effectiveness of the adhesive used.

If it is desired to retain the articles 28 and 48 in the adhered condition, the vacuum is not introduced and the elements 42 and 44 are separated by operation of the air cylinder causing the upepr element 44 to rise without attempting to pull the articles 28 and 48 apart. Therefore, the sample 30 can be removed from the pressure element 42 completely intact.

The machine is so designed that sufficient space is provided along the path of travel of the carirage 24 for installation of a heated shoe, a flame, or the like, to remove or drive in surface wax so as to increase the bonding ability of the adhesive.

The machine of the present invention permits the following variations in preparation of test samples: temperature of adhesive, extruding pressure of adhesive, speed at which test samples pass beneath the adhesive applicator. The time between the application of adhesive and sandwiching of the articles between the pressure elements can be set as desired. The pressure used to cause the adherence of the test articles together can be controlled. The time the articles are held under pressure is also adjustable. Since the adhesive applicators can be moved, the distance between the extruding nozzle on the adhesive applicator and the sample article being conveyed by the carriage can be adjusted to accommodate different thicknesses of test articles. The amount of adhesive applied can also be varied as desired.

The machine is quite universal in that the two sample articles to be secured to each other are separated from one another until after they are connected. This permits one type of board to be test-glued to another type of board, and also permits varying types of boards to be interchanged. Thus, one can interchangeably secure corrugated board, solid fibreboard, folding carton craft, or the like, as one desires. The various materials can be treated in any particular manner, such as by curtain coating, sizing treatments or by provision of adhesive release printing surfaces.

The substantial number of variations possible in this machine permits establishment of practically any desired condition in test atmosphere which is identical, or closely resembles, the condition that a paperboard blank undergoes while it is being formed into a container at a manufacturer's plant.

We claim:

1. A machine for testing characteristics of an adhesive used to bond a pair of articles to each other, comprising:
   (a) conveying means for transporting at least one of said articles at selected speed along a predetermined path between first and second stations of the machine;
   (b) at least one adhesive applicator located at said first station for applying selected pattern and amount of adhesive having selected temperature to said one article being conveyed past said applicator at selected speed;
   (c) a pair of spaced pressure elements positioned in an overlying relationship at said second station having means for:
(i) receiving said pair of articles with each pressure element holding one of said articles;
(ii) bringing said articles together at predetermined pressure and holding them in contact with each other for a predetermined length of time to cause the articles to adhere to each other;
(iii) means for separating said articles from each other under predetermined conditions;
(iv) means for determining the effectiveness of said applied adhesive by measuring the force necessary to separate said articles from each other.

2. A machine as defined in claim 1, wherein each of said pressure elements has an article receiving surface for holding an article therein.

3. A machine as defined in claim 2, wherein at least one of said article receiving surfaces is provided with vacuum means for holding one of said articles against said surface.

4. A machine as defined in claim 2, wherein each of said surfaces retains one of said articles to be sandwiched between said pressure elements when said elements are brought in registry with each other to cause adherence of the articles to each other.

5. A machine as defined in claim 4, wherein the effectiveness of said applied adhesive is determined by measuring the force necessary to separate said articles from each other when said pressure elements are being moved out of registry under the application of vacuum to each of said elements.

6. A machine for testing samples of laminated sheet material such as sheets of paperboard, comprising:
(a) a variable speed conveying means for advancing a first article along a predetermined path at selected speed to substantially simulate the speed of a paperboard blank traveling through a container forming machine;
(b) at least one adhesive applicator secured adjacent said path for applying a selected pattern and amount of adhesive on said first article when the same is being advanced past said applicator;
(c) spaced upper and lower pressure elements positioned adjacent said path downstream from said applicator:
 (i) the upper element being adapted to releasably hold a second article;
 (ii) the lower element being adapted to receive at least a portion of the first article advanced thereon by said conveying means from said applicator and having a pattern of adhesive applied thereon;
(d) means for lowering said upper element into registry with said lower element thereby sandwiching said first and second articles therebetween under predetermined pressure to cause said articles to adhere to each other;
(e) means for determining the effectiveness of said applied adhesive by measuring the force necessary to separate said articles from each other.

References Cited
UNITED STATES PATENTS

| | | | |
|---|---|---|---|
| 2,604,783 | 7/1952 | Herrlinger | 73—150 |
| 3,253,461 | 5/1966 | Blanchard et al. | 73—150 |
| 3,372,583 | 3/1968 | Beek | 73—150 |
| 3,394,588 | 7/1968 | Mohle et al. | 73—150 |

LOUIS R. PRINCE, Primary Examiner
W. A. HENRY II, Assistant Examiner